INVENTOR.
HAROLD G. LEE
BY
BUCKHORN, CHEATHAM & BLORE
ATTORNEYS

INVENTOR.
HAROLD G. LEE

BY
BUCKHORN, CHEATHAM & BLORE
ATTORNEYS

United States Patent Office 3,219,772
Patented Nov. 23, 1965

3,219,772
INSTANTANEOUS SWITCHING DEVICE FOR A
TOTAL FLOW METER AND RECORDER
Harold G. Lee, Portland, Oreg., assignor to Leupold &
Stevens Instruments, Inc., Portland, Oreg., a corporation of Oregon
Filed Nov. 27, 1961, Ser. No. 155,097
2 Claims. (Cl. 200—56)

The present invention is an improvement in a recording instrument comprising signaling means including a mercury bulb switch so arranged as to signal the operation of a totalizer to a station remote from the instrument. The principal purpose of the invention is to provide means whereby a condition being measured may be observed or recorded at a distant point. For example, the volume of water over a weir or in a stream may be continuously observed, recorded and totalized at a central station.

The present invention is particularly designed to operate in conjunction with a totalizer of the type including a frictionally driven totalizer wheel driving a totalizer shaft, the periphery of which engages a constant speed turntable at variable distances from the axis of the turntable. Because of the nature of such totalizer driving means it is extremely important that any switch actuating mechanism moved by the totalizer shaft should not impose a great strain against the rotation of the shaft or the friction drive will slip and cause erroneous readings.

Furthermore, it is important that the signal should be sharp and instantaneous or blurring of one signal into another, such as when a stream, during high flows, might cause false readings at the distant station.

Having the principal objects of the present invention in mind the advantages thereof will be readily apparent from the following disclosure taken in connection with the accompanying drawings wherein a preferred form of the invention is described and illustrated.

Figure 1:
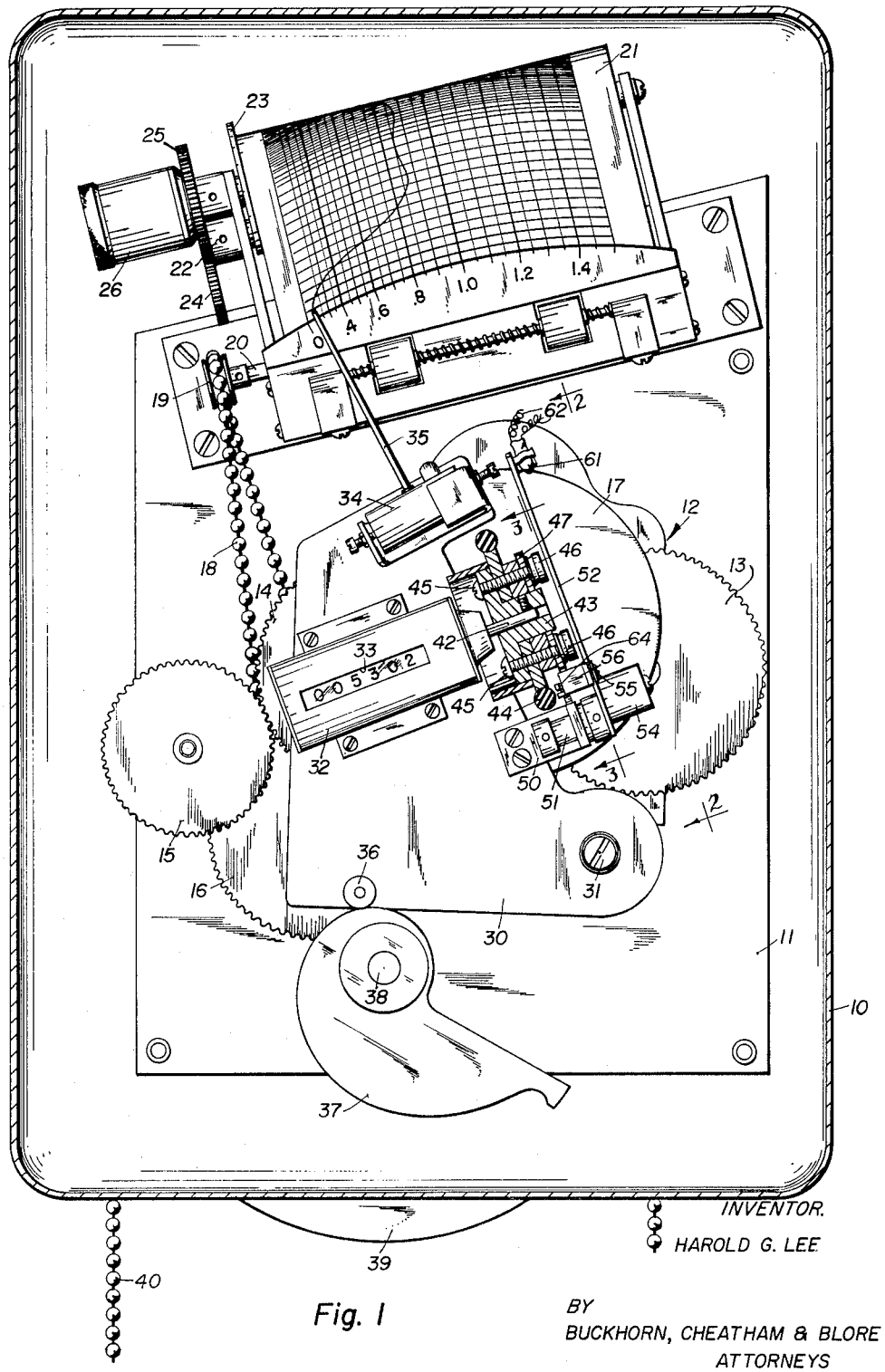
FIG. 1 is a view in elevation of a recording instrument having the present invention associated therewith.

A typical measuring instrument is illustrated in FIG. 1 and comprises a water level gauge. The instrument comprises a housing 10 in which there is provided a mounting plate 11. The mounting plate supports a clock mechanism 12 which drives a gear train including gears 13, 14, 15 and 16, as well as other intermeshing gears which are not shown. The gears drive, at a constant rate, a turntable 17 of a planimeter type totalizing device and also drive, at a constant rate, a beaded drive chain 18 which is trained about a driven pulley 19 on a shaft 20 of a roll (not shown) about which is trained a graph tape 21. The tape is drawn from a supply roll (not shown) on a shaft 22 and wound up on a supply roll 23. Gears 24 and 25 connect the supply roll shaft to the take-up roll shaft through a clutch device 26.

A pivoted plate 30 is mounted in front of the gear train on a pivot 31, the plate supporting a totalizer 32 having a window 33 through which the total reading may be viewed, and also mounts an inking device including a reservoir 34 and a pen 35 by means of which a record of variations in the measured condition against time is made upon the tape 21. The pen 35 is shifted across the graph tape by means of a follower roller 36 mounted upon the plate 30 and bearing against a cam 37. The cam 37 is mounted upon a shaft 38 fixed to a pulley 39 around which a bead chain 40 is trained. The chain 40 is affixed to a float or other device (not shown) which is moved in accordance with the variations of the condition being measured, such as the level of a stream of water. The instrument is calibrated for the particular condition being measured so that the line drawn upon the graph tape will give a continual reading of the condition, which in this case may be utilized to measure the volume of stream flow.

The totalizer comprises a shaft 42 to which is affixed the hub 43 of a planimeter type measuring wheel 44, the wheel comprising a narrow contact friction tread which engages the surface of the turntable 17. When the wheel engages the turntable at the center thereof the shaft 42 will not be moved, and the pen 35 will indicate that the flow is zero. As the cam 37 pivots the plate 30 clockwise the point of engagement of the wheel with the turntable will be shifted outwardly from the axis of the turntable. The further it is shifted outwardly the faster the rotation of the wheel, hence the faster the totalizer will be actuated to indicate total flow. At the same time the pen 35 will be shifted to the right to indicate deeper flow.

The hub 43 mounts a pair of screws 45 which hold the measuring wheel on the hub and are engaged by a pair of knurled nuts 46 which clamp a dam disc 47 coaxially with respect to the totalizer shaft and the wheel thereon. The periphery of the disc 47 is provided with a plurality of equidistantly spaced projections or teeth 48 along its periphery, there being ten in number corresponding to the digits of the decimal system counter 32. There could be any other number of projections, depending upon the type of measuring device used and the maximum rate of flow to be recorded.

Figure 2:
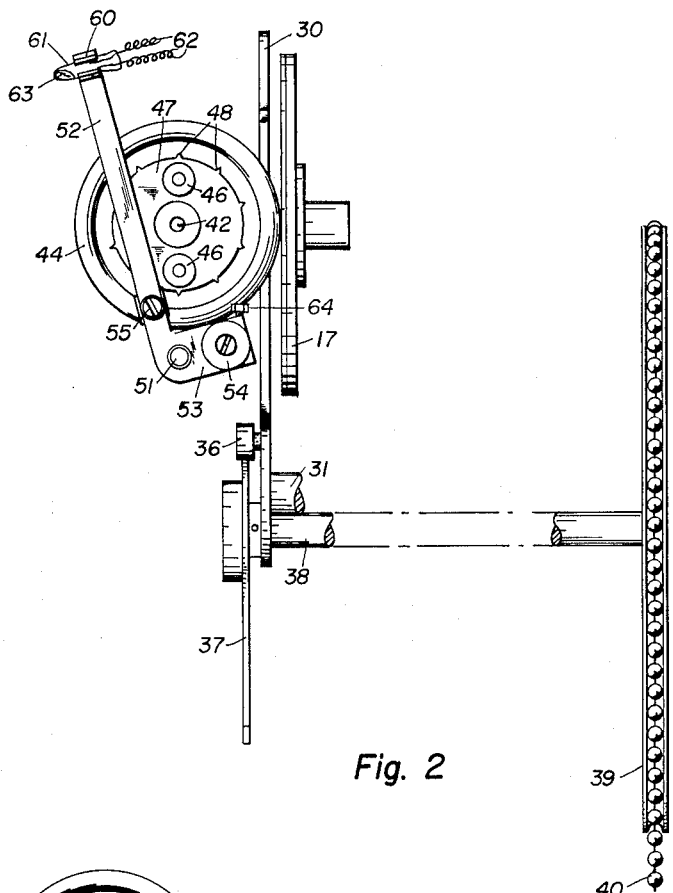
FIG. 2 is a partial vertical section taken substantially along line 2—2 of FIG. 1, with all parts removed which are not necessary for an understanding of the present invention.
Figure 3:
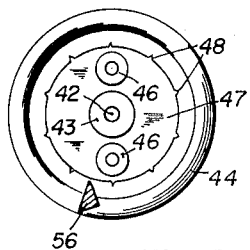
FIG. 3 is a partial vertical section taken substantially along line 3—3 of FIG. 1.

The plate 30 supports a bracket 50 upon which is mounted a pivot 51 pivotally mounting a lever 52 which extends upwardly in spaced relation to the measuring wheel and the nuts 46 thereon. The lever projects upwardly at an acute angle to the vertical through the pivot 51, and an arm 53 integral therewith supports a counterweight 54 constituting a means tending yieldably to pivot the lever 52 clockwise in FIG. 2. A screw 55 fastens projection engaging means comprising a sharp tooth-like tab or follower member 56 to the rear surface of the lever 52 in such position that the upwardly projecting knife edge of the tab is close to the periphery of the member or disc 47 when the lever is at rest and is periodically engaged by the projections 48 to move the lever counterclockwise. The free end of the lever 52 is provided with a spring clamp 60 which supports a mercury switch bulb 61. The bulb 61 extends at right angles to the lever 52 and hence is always maintained at an acute angle to the horizontal. A pair of pigtail leads 62 lead to spaced contacts within the upper end of the bulb, and the mercury drop 63 in the bulb is hence normally out of contact therewith so that the switch is normally open. The lever 52 normally rests at the position shown in FIG. 2 when the member 56 is in close proximity to the periphery of the disc 47. As one of the projections 48 engages the member 56 the lever is rocked counterclockwise a short distance, raising the counterweight 54. As the tip of the projection 48 is disengaged from the knife edge of the member 56, the weight 54 will cause the lever to rock back toward its position of rest as shown in FIG. 2. This movement will be abruptly arrested whereby the inertia of movement causes the mercury drop 63 to travel to the upper end of the bulb and momentarily make contact, thus closing the circuit through the leads 62. A screw 64 mounted on lever 52 engages the bracket 50 to determine the rest position of the lever and to prevent the knife edge of member 56 from banging against the disc 47. It is to be appreciated that the leads 62 comprise a portion of any suitable circuit, such as a closed wire circuit leading to a distant totalizer, signaling device, measuring device or indicating instrument, or to a wireless transmitter which will send a pulse wave to a distant receiver. Any such device is mounted suitably within the housing 10 and not shown herein.

The diameter of the disc 47 is such in relation to the height of the projections 48 that a single, sharp signal will be given of each increment of movement of the wheel 44 regardless of the rate of rotation of the wheel. The resistance to movement of the lever is so slight that the wheel will not be caused to slip with respect to the turntable. The arrangement is such that only sufficient force is imparted to the mercury to cause it to make one short, instantaneous contact. The tab 56 and the projections 48 with the counterweight 54 constitute a snap-acting trip means.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In a signaling device for use with a condition-measuring instrument including a shaft rotated at a rate of speed in accordance with the magnitude of the condition measured,
   a mercury bulb switch having a pair of contacts at one end thereof and a drop of mercury therein,
   lever means mounting the switch rockably relative to the shaft and movable between a first position holding the switch inclined relative to the horizontal at a predetermined acute angle at one side of the horizontal in which the drop of mercury is at the other end of the switch and a second position holding the switch more inclined relative to the horizontal than when the lever means is in the first position thereof and at the same side of the horizontal as when in the first position,
   a disc rotated by the shaft at rates of speed proportional to the rates of speed of the shaft and having sharp driving teeth spaced therearound and movable in a predetermined path,
   a sharp follower tooth on the lever means in a position in which the follower tooth is in the path of the driving teeth when the lever means is in the first position thereof,
   and means urging the lever means toward the first position thereof,
   the driving teeth and the follower tooth serving to cause the lever means to move from the first to the second position thereof, said means for urging the lever means causing return of said lever toward the first position thereof with sufficient speed that the drop of mercury is thrown against the action of gravity momentarily into bridging engagement with the contacts as each driving tooth and moves past the follower tooth and then is moved by gravity away from the contacts.

2. In a signaling device,
   a condition measuring instrument including a shaft rotated at a rate of speed in accordance with the magnitude of the condition measured,
   a mercury bulb switch having a pair of spaced contacts at one end thereof and a drop of mercury therein adapted to electrically connect the contacts when at said one end,
   lever means mounting the switch rockably relative to the shaft for movement only between first position and a second position.
   and snap-acting trip means including cam means driven by the shaft and follower means coupled to the lever means and intermittently tripped by the cam means for moving the switch to its first position and then returning the switch to its second position with speed sufficient to throw the drop of mercury along the switch against the action of gravity so that the drop of mercury is thrown from one position relative to the contacts to a second position relative thereto and then drops by gravity back to the first position relative to the contacts.

References Cited by the Examiner
UNITED STATES PATENTS

| | | | |
|---|---|---|---|
| 1,787,176 | 12/1930 | Spitzglass | 200—153 |
| 2,072,362 | 3/1933 | Womack | 200—61.47 |
| 2,577,155 | 12/1951 | Rex. | |
| 2,831,183 | 4/1958 | Erich | 200—61.47 |
| 3,024,662 | 3/1962 | Ryan | 200—61.47 |

BERNARD A. GILHEANY, *Primary Examiner.*